United States Patent Office 3,064,036
Patented Nov. 13, 1962

3,064,036
ALKYL 2-HALO-3-(ARYLTHIO)PROPIONATES
Samuel Allen Heininger, Warson Woods, Mo., and Gail H. Birum, Dayton, Ohio, assignors to Monsanto Chemical Company, St. Louis, Mo., a corporation of Delaware
No Drawing. Filed Aug. 15, 1958, Ser. No. 755,141
4 Claims. (Cl. 260—470)

This invention relates to aromatic products and more particularly to the reaction products of aromatic sulfenyl halides with olefinic acids and esters and to certain new compounds obtained by this reaction. This application is a continuation-in-part of my copending applications Serial No. 641,478 and 641,479, filed February 21, 1957 and both now abandoned.

The literature reports the addition of sulfenyl halides to certain olefinic compounds but when the olefinic double bond of the addend is adjacent to a negative substituent there is inhibition of such addition. Thus Karasch and Buess, J. Am. Chem. Soc., 71, 2726, 1st column (1949) found that dinitrobenzenesulfenyl chloride would not add to the double bond of acrylonitrile, though this reagent had been successfully added to the double bond of other olefinic hydrocarbons such as styrene. Turner and Conner, J. Am. Chem. Soc. (1947) 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Other experiments have confirmed this finding of the non-reactivity of nitrobenzenesulfenyl halides with olefins wherein the olefinic double bond is alpha to a negative substituent. Furthermore, although perchloromethyl mercaptan (trichloromethanesulfenyl chloride) is known to add readily to the double bond of a variety of olefinic compounds, we have not been able to cause a reaction of this sulfenyl halide with acrylonitrile or with an acrylate ester. It has now been found, however, that the reaction of an acrylic compound can be successfully accomplished with an aromatic sulfenyl halide.

The presently-useful acrylic compounds comprise $\alpha,\beta$-olefinic acids and esters thereof having the formula

RCH=CRCOOR′ where each R represents hydrogen or hydrocarbon radicals free of aliphatic unsaturation and containing from 1 to 6 carbon atoms, provided that at least one R represents hydrogen, and R′ represents hydrogen or a hydrocarbon radical free of aliphatic unsaturation and containing from 1 to 16 carbon atoms (by aliphatic unsaturation is herein meant olefinic or acetylenic, carbon-to-carbon unsaturation). Acrylic acid and its alkyl esters, where each R in the above formula represents hydrogen and R′ represents hydrogen or a saturated aliphatic hydrocarbon radical, are the preferred members of this series for reasons of ready availability and low cost as well as high reactivity. Exemplary of presently-useful alkyl esters of acrylic acid are methyl acrylate, ethyl acrylate, isopropyl acrylate, t-butyl acrylate, neopentyl acrylate, n-hexyl acrylate, 2-ethylhexyl acrylate, 2-ethyloctyl acrylate, nonyl acrylate, decyl acrylate, tridecyl acrylate, tetradecyl acrylate, hexadecyl acrylate, etc. Other esters of acrylic acid which undergo the process of the invention include aromatic esters, such as phenyl acrylate, p-tolyl acrylate, cresyl acrylate (i.e. isomeric mixed tolyl esters of acrylic acid) 2,4-xylyl acrylate, cuminyl acrylate, 2-phenylethyl acrylate, etc. and alicyclic esters, such as cyclohexyl acrylate. There may also be utilized in the process of the invention $\beta$-hydrocarbon-substituted acrylic acids and esters thereof, such as methyl cinnamate, ethyl p-methylcinnamate, nonyl 2-hexenoate, amyl 3-hexylacrylate, phenyl cinnamate, cresyl 2-hexenoate, etc.

Alternatively to acrylic acid and its esters, there may be employed in the process of the invention $\alpha$-hydrocarbyl-substituted acrylic acids and their esters. Such compounds, containing a terminal olefinic bond, are highly reactive in the process of the invention. The present $\alpha$-substituted compounds, in reacting with the arenesulfenyl halides in accordance with this invention, may result in the formation of products differing in some respects from the reaction products of $\alpha,\beta$-olefinic acids free of alpha substituents, i.e., in that the alpha substituent has a directing influence, and the products are more likely to be single compounds than mixtures, but such products are also contemplated within the scope of this invention. The preferred $\alpha$-substituted acrylic acid compounds for use in the process of this invention are methacrylic acid and the alkyl esters thereof, e.g., methyl methacrylate, propyl methacrylate, butyl methacrylate, octyl methacrylate, nonyl methacrylate, 2-ethyloctyl methacrylate, tridecyl methacrylate, etc. The esterifying alcohol from which the presently useful methacrylate esters are derived may alternatively be an aromatic or alicyclic radical, as exemplified by $\beta$-naphthyl methacrylate, phenyl methacrylate, cresyl methacrylate, benzyl methacrylate, cyclohexyl methacrylate, etc. Instead of methacrylic acid and its esters, there may be utilized compounds wherein a radical of higher molecular weight than the methyl group is present as a substituent alpha to the carboxylic function of an acrylic acid, such as 2-methylenebutyric acid, 2-phenylacrylic acid (atropic acid), methyl 2-methylenebutyrate, ethyl 2-methylenebutyrate, methyl 2-neopentylacrylate, methyl atropate, methyl 2-cyclohexylacrylate, phenyl 2-methylenebutyrate, cresyl atropate, etc.

In accordance with this invention an $\alpha,\beta$-unsaturated acid or ester thereof is reacted with an arenesulfenyl halide. Chlorine is the preferred halide radical; it is also possible to employ bromo or iodo substituents in the sulfenyl halide portion of the molecules as a substitute for chlorine; the halogen fluorine is generally less reactive and is not preferred. The presently useful sulfenyl halides are those wherein the sulfenyl halide radical is attached directly to a nuclear carbon atom of an aromatic radical containing up to 12 carbon atoms and up to 2 benzene rings. By aromatic radical is herein meant, a radical containing a benzene ring or fused benzene rings. Exemplary of presently-useful monocyclic aromatic sulfenyl halides are benzenesulfenyl chloride, benzenesulfenyl bromide, benzenesulfenyl iodide; alkylbenzenesulfenyl halides such as o-, m-, and p-toluenesulfenyl chloride, 2,4-xylenesulfenyl chloride, 3,5-xylenesulfenyl chloride, 2,6-xylenesulfenyl chloride, 2,5-xylenesulfenyl chloride, 2,4-xylenesulfenyl bromide, 2,4,5-trimethylbenzenesulfenyl chloride, 2,3,5,6-tetramethylbenzenesulfenyl chloride, 4-ethylbenzenesulfenyl chloride, 2,4-diethylbenzenesulfenyl chloride, 4-isopropylbenzenesulfenyl chloride, 4-tertbutylbenzenesulfenyl chloride, 2-methyl-4-isopropylbenzenesulfenyl chloride, 4-n-hexylbenzenesulfenyl chloride, etc. Mixed alkylbenzenesulfenyl halides such as mixed toluenesulfenyl chlorides, which may be designated as cresylsulfenyl chlorides, or mixed xylenesulfenyl chlorides, may also be used in the process of this invention. Another class of presently-useful sulfenyl halides are polycyclic aromatic sulfenyl halides, e.g., 1-naphthalenesulfenyl chloride, 2-naphthalenesulfenyl chloride, 2-naphthalenesulfenyl bromide, 4-biphenylsulfenyl chloride, 3-biphenylsulfenyl chloride, 4-cyclohexyl benzenesulfenyl chloride, 5-methylnaphthalenesulfenyl chloride, 5,8-dimethylnaphthalenesulfenyl chloride, etc.

Another class of useful aromatic sulfenyl halides of the invention are the halogen-substituted benzenesulfenyl halides such as 2-, 3-, or 4-chlorobenzenesulfenyl chloride, 2-, 3-, or 4-bromobenzenesulfenyl chloride 2,3- 3,4- or 2,4-dichlorobenzenesulfenyl chloride, 2,4,6-trichlorobenzenesulfenyl chloride, 4-bromobenzenesulfenyl bromide, 2-chloro-4-bromobenzenesulfenyl chloride, 3-fluorobenzenesulfenyl chloride, 4-iodobenzenesulfenyl chloride, pentachlorobenzenesulfenyl chloride, etc. As illustrative of halogenated aromatic polycyclic-sulfenyl halides which, when available, can also be employed in the process of the invention, may be listed 5-chloronaphthalenesulfenyl chloride, 5,8-dichloronaphthalenesulfenyl chloride, 4'-chlorobiphenylsulfenyl chloride, etc. It will be appreciated that there may also be employed in the process of the invention alkyl-substituted halogenated arenesulfenyl halides, e.g., 3-chloro-4-methylbenzenesulfenyl chloride,
2-chloro-4-methylbenzenesulfenyl chloride,
2,4-dichloro-3-methylbenzenesulfenyl chloride,
2-chloro-4-isopropylbenzenesulfenyl chloride,
2,3-dimethyl-4-chlorobenzenesulfenyl chloride,
3,5-dichloro-4-neopentylbenzenesulfenyl chloride, etc.

This invention also contemplates the use of halogenated arenesulfenyl halides such as (chloromethyl)benzenesulfenyl chloride, 3-chloro-4-(chloromethylbenzenesulfenyl chloride, 2,3-bis(chloroethyl)benzenesulfenyl chloride, 3-chloro-4-(chloropropyl)benzenesulfenyl chloride, etc.

In the present reaction what we believe to occur is the formation of an adduct as illustrated by the following equation:

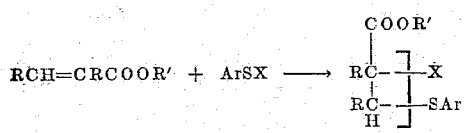

where RCH=CRCOOR' represents an α,β-olefinic acid or ester as defined above and ArSX represents an aromatic sulfenyl halide of the presently-useful variety. Judging from considerations of theoretical electron distribution, the sulfenyl halide halogen atom X would be expected to be attached in part or all of such product to the beta carbon atom of the acid component, especially when the alpha carbon atom thereof has a hydrocarbon substituent. However, evidence proving the point of attachment is lacking, and we prefer not to be bound by such speculation. Quite possibly a mixture of α-halo-β-thio and β-halo-α-thio isomers is formed.

Our present products having the adduct structures as shown above may be characterized as 3(2)-halo-2(3)-(arylthio)-alkanoic acids and esters, where by such nomenclature is meant a 3-halo-2-(arylthio)alkanoic and/or 2-halo-3-(arylthio)alkanoic acid or ester. Thus, the product of reaction of benzenesulfenyl chloride and methyl acrylate in accordance with this invention is named as methyl 3(2)-chloro-2(3)-(phenylthio)propionate.

Exemplary of presently provided products of the reaction of acrylic acid and alkyl acrylates with benzenesulfenyl halides are, e.g., 3(2)-chloro-2(3)-(phenylthio)propionic acid,
methyl 3(2)-chloro-2(3)-(phenylthio)propionate,
methyl 3(2)-bromo-2(3)-(phenylthio)propionate,
ethyl 3(2)-chloro-2(3)-(phenylthio)propionate,
isobutyl 3(2)-chloro-2(3)-(phenylthio)propionate,
2-ethylhexyl 3(2)-chloro-2(3)-(phenylthio)propionate,
tridecyl 3(2)-chloro-2(3)-(phenylthio)propionate, etc.

Another class of the presently provided adducts of acrylic acid and alkyl acrylates are those obtained from methylbenzenesulfenyl halides, e.g., methyl 3(2)-chloro-2(3)-(tolylthio)propionate,
ethyl 3(2)-chloro-2(3)-(2,4-xylylthio)propionate,
methyl 3(2)-chloro-2(3)-(p-tolylthio)propionate,
isobutyl 3(2)-bromo-2(3)-(m-tolylthio)propionate,
2-ethylhexyl 3(2)-chloro-2(3)-(p-tolylthio)propionate,
nonyl 3(2)-chloro-2(3)-(3,5-xylylthio)propionate,
methyl 3(2)-chloro-2(3)-(3,4-xylylthio)propionate,
tridecyl 3(2)-chloro-2(3)-(3,4-xylylthio)propionate,
methyl 3(2)-iodo-2(3)-(p-tolylthio)propionate,
methyl 3(2)-chloro-2(3)-(trimethylphenylthio)propionate,
methyl 2(3)-chloro-2(3)-(tetramethylphenylthio)propionate, etc.

Exemplary of the reaction products of acrylic acid and alkyl acrylates with benzenesulfenyl halides substituted by alkyl radicals of higher molecular weight than the methyl group are, e.g., methyl 3(2)-chloro-2(3)-(4-ethylphenylthio)propionate,
methyl 3(2)-chloro-2(3)-(4-isopropylphenylthio)propionate,
methyl 3(2)-chloro-2(3)-(2,4-diethylphenylthio)propionate,
methyl 3(2)-chloro-2(3)-(4-isobutylphenylthio)propionate,
methyl 3(2)-chloro-2(3)-(2-methyl-4-ethylphenylthio)propionate,
isobutyl 3(2)-chloro-2(3)-(4-isopropylphenylthio)propionate,
2-ethylhexyl 3(2)-chloro-2(3)-(4-neopentylphenylthio)propionate,
hexadecyl 3(2)-chloro-2(3)-(3-isopropylphenylthio)propionate, etc.

Additionally, this invention provides adducts of acrylic acid and alkyl acrylates with polycyclicsulfenyl halides, such as methyl 3(2)-chloro-2(3)-(naphthylthio)propionate,
ethyl 3(2)-chloro-2(3)-(biphenylthio)propionate,
2-ethyloctyl 3(2)-chloro-2(3)-(4-cyclohexylphenylthio)propionate.

Another class of presently provided arylthio-substituted haloalkanoic acid compounds are those derived from acrylic esters with cyclic alcohols, e.g., phenyl 3(2)-chloro-2(3)-(phenylthio)propionate,
cresyl 3(2)-chloro-2(3)-(tolylthio)propionate,
benzyl 3(2)-chloro-2(3)-(2,4-xylylthio)propionate,
cyclohexyl 3(2)-chloro-2(3)-(2,4-diethylphenylthio)propionate,
phenyl 3(2)-chloro-2(3)-(naphthylthio)propionate, etc.

Exemplary of the presently provided products of the reaction of acrylic acid and alkyl acrylates with halobenzenesulfenyl halides are, e.g., 3(2)-chloro-2(3)-(4-chlorophenylthio)propionic acid,
methyl 3(2)-chloro-2(3)-(4-chlorophenylthio)propionate,
methyl 3(2)-bromo-2(3)-(4-chlorophenylthio)propionate,
methyl 3(2)-chloro-2(3)-(2,4-dichlorophenylthio)propionate,
methyl 3(2)-chloro-2(3)-(3,4-dichlorophenylthio)propionate,
ethyl 3(2)-chloro-2(3)-(4-bromophenylthio)propionate,
methyl 3(2)-bromo-2(3)-(4-fluorophenylthio)propionate,
isobutyl 3(2)-chloro-2(3)-(4-iodophenylthio)propionate,
amyl 3(2)-chloro-2(3)-(2,4,5-trichlorophenylthio)propionate,
2-ethylhexyl 3(2)-chloro-2(3)-(pentachlorophenylthio)propionate,
2-ethyloctyl 3(2)-chloro-2(3)-(4-chlorophenylthio)propionate, etc.

Another class of the presently provided reaction products of acrylic acid and alkyl acrylates are those obtained from halogenated alkylbenzenesulfenyl halides, e.g., methyl 3(2)-chloro-2(3)-2(3)-(3-chloro-4-methylphenylthio)propionate, isodecyl 3(2)-chloro-2(3)-(4-chloro-2,5-dimethylphenyl-thio)propionate,
tridecyl 3(2)-chloro-2(3)-(3-chloro-4-isobutylphenylthio)propionate,
methyl 3(2)-chloro-2(3)-(4-chloromethylphenylthio)propionate, etc.

Additionally, this invention provides reaction products of acrylic acid and alkyl acrylates with polycyclic halogenated sulfenyl halides such as methyl 3(2)-chloro-2(3)-(5-chloronaphthylthio)propionate,
ethyl 3(2)-chloro-2(3)-(trichlorobiphenylthio)propionate,
methyl 3(2)-chloro-2(3)-(4'-bromo-4-cyclohexylphenylthio)propionate, etc.

Another class of presently provided haloarylthio-substituted haloalkanoic acid compounds are those derived from acrylic esters with alicyclic and aromatic alcohols, e.g., phenyl 3(2)-chloro-2(3)-(4-chlorophenylthio)propionate,
cresyl 3(2)-chloro-2(3)-(4-chlorophenylthio)propionate,
benzyl 3(2)-chloro-2(3)-(2,4-dichlorophenylthio)propionate,
cyclohexyl 3(2)-chloro-2(3)-(4-chlorophenylthio)propionate, etc.

By application of the present process of reacting an aromatic sulfenyl halide with an acrylic acid or ester wherein the beta carbon atom of the acid component is substituted by a hydrocarbon radical, there may be prepared compounds such as 3(2)-chloro-2(3)-(xylylthio)-3-phenylpropionic acid,
methyl 3(2)-chloro-2(3)-(phenylthio)butyrate,
methyl 3(2)-chloro-2(3)-(tolylthio)butyrate,
methyl 3(2)-chloro-2(3)-(tolylthio)-3-phenylpropionate,
isobutyl 3(2)-chloro-2(3)-(tolylthio)-3-phenylpropionate,
2-ethylhexyl 3(2)-chloro-2(3)-(xylylthio)butyrate, etc.

The presently provided compounds derived in accordance with this invention by the reaction of α-substituted acrylic acids and esters of the above formula with the presently-useful arene-sulfenyl halides are exemplified by compounds derived from methacrylic acid and alkyl esters thereof, e.g., 3(2)-chloro-2(3)-(phenylthio)-2-methylpropionic acid, methyl 3(2)-chloro-2(3)-(phenylthio)-2-methylpropionate, ethyl 3(2)-chloro-2(3)-(phenylthio)-2-methylpropionate, nonyl 3(2)-chloro-2(3)-(phenylthio)-2-methylpropionate, methyl 3(2) - chloro - 2(3)-(tolylthio)-2-methylpropionate, methyl 3(2)-chloro-2(3)-(xylylthio)-2-methylpropionate, isoamyl 3(2)-chloro-2(3) - (tolylthio) - 2 - methylpropionate, tridecyl 3(2)-3(2)-chloro-2(3)-(xylylthio) - 2 - methylpropriate, hexadecyl 3(2)-chloro-2(3)-(xylylthio)-2-methylpropionate, methyl 3(2)-chloro-2(3)-(2,4-diethylphenylthio)-2-methylpropionate, ethyl 3(2)-chloro-2(3)-(2-methyl-4-ethylphenylthio)-2-methylpropionate, methyl 3(2)-chloro-2(3)-chloro-2(3) - (4-isopropylphenylthio)-2-methylpropionate, methyl 3(2)-chloro-2(3)-(biphenylthio)-2-methylpropionate, etc. Another class of presently provided arylthio-substituted haloalkenoic acid compounds are those obtained in accordance with the invention from methacrylic esters with alicyclic and aromatic alcohols, e.g., phenyl 3(2)-chloro-2(3)-(phenylthio)-2-methylpropionate, phenyl 3(2)-bromo-2(3)-tolylthio)-2-methylpropionate, cresyl 3(2)-chloro-2(3)-(xylylthio)-2-methylpropionate, p-tolyl 3(2)-chloro-2(3)-(4-neopentylphenylthio)-2-methylpropionate, benzyl 3(2)-chloro-2(3)-(xylyl-thio)-2-methylpropionate, cyclohexyl 3(2)-chloro-2(3)-(tolylthio)-2-methylpropionate, etc. Other compounds which may be prepared by the reaction of this invention include the adducts derivable from α-hydrocarbyl acrylic acids wherein the α-hydrocarbyl substituent is higher than methyl, e.g., compounds derived from 2-methylenebutyric acid and esters thereof such as methyl 3(2)-chloro-2(3)-(tolylthio)-2-ethylpropionate, methyl 3(2)-chloro-2(3)-(xylylthio)-2-ethylpropionate, benzyl 3(2) - chloro-2(3)-(xylylthio) - 2 - ethylpropionate, etc.; compounds derived from 2-methyleneoctanoic acid and esters thereof such as methyl 3(2)-chloro-2(3)-(tolylthio)-2-hexylpropionate, cresyl 3(2)-chloro-2(3)-tolylthio)-2-hexylpropionate, cyclohexyl 3(2)-chloro-2(3)-(tolylthio)-2-isohexylpropionate, etc.; compounds derivable from 2-methylene-4,4-dimethylpentanoic acid and its esters such as methyl 3(2)-chloro-2(3)-(tolylthio)-2-neopentylpropionic acid; compounds obtainable from atropic acid and esters thereof such as methyl 3(2)-chloro-2(3)-(tolylthio)-2-phenylpropionate, etc.

By application of the present process of reacting a halogenated aromatic sulfenyl halide with an acrylic acid or ester wherein the beta carbon atom at the acid component is substituted by a hydrocarbon radical, there may be prepared compounds such as methyl 3(2)-chloro-2(3)-(4-chlorophenylthio)butyrate, ethyl 3(2)-chloro-2(3)-(2,4-dichlorophenylthio)hexanoate, methyl 3(2)-chloro-2(3) - (4-chlorophenylthio) - 3-phenylpropionate, etc.

Exemplary of the presently provided compounds derived in accordance with this invention by the reaction of α-substituted acrylic acids and esters of the above formula with the presently useful halogenated arenesulfenyl halides are compounds derived from methacrylic acid and alkyl esters thereof, e.g., 3(2)-chloro-2(3)-(2-chlorophenylthio)-2-methylpropionic acid, 3(2)-chloro-2(3)-(4-chlorophenylthio)-2-methylpropionic acid, 3(2)-chloro-2(3)-(3,4-dichlorophenylthio)-2-methylpropionic acid, methyl 3(2) - chloro-2(3)-(3-chlorophenylthio)-2-methylpropionate, ethyl 3(2) - chloro - 2(3) - (4-chlorophenylthio)-2-methylpropionate, methyl 3(2)-bromo-2(3)-(2,4-dichlorophenylthio)-2-methylpropionate, isobutyl 3(2)-chloro-2(3) - (4-fluorophenylthio)-2-methylpropionate, 2-ethylhexyl 3(2)-chloro-2(3)-(4-chlorophenylthio)-2-methylpropionate, nonyl 3(2)-chloro-2(3)-(4-iodophenylthio)-2-methylpropionate, tridecyl 3(2)-chloro-2(3)-(4-chlorophenylthio)-2-methylpropionate, hexadecyl 3(2)-chloro-2(3) - (2,4,5-trichlorophenylthio) - 2 - methylpropionate, methyl 3(2)-chloro-2(3)-2-chloro-4-methylphenylthio)-2-methylpropionate, methyl 3(2)-chloro-2(3)-(4-(chloromethyl)phenylthio)-2-methylpropionate, methyl 3(2)-chloro-2(3) - (5-chloronaphthylthio)-2-methylpropionate, etc. Another class of presently provided haloarylthio-substituted halolkanoic acid compounds are those obtained in accordance with this invention from methacrylic acid esters with alicyclic and aromatic alcohols, e.g., phenyl 3(2) - chloro - 2(3) - (4 - chlorophenylthio) -2 - methylpropionate, cresyl 3(2)-bromo-2(3)-(2,4-dichlorophenylthio)-2-methylpropionate, benzyl 3(2)-chloro-2(3)-(3,4-dichlorophenylthio)-2-methylpropionate, cyclohexyl 3(2)-chloro-2(3) - (4-chlorophenylthio) - 2-methylpropionate, etc. Other compounds which may be prepared by the reaction of this invention include the compounds derivable from α-hydrocarbyl acrylic acids wherein the hydrocarbyl substituent is higher than methyl, e.g., compounds derived from 2-methylenebutyric acid and esters thereof such as 3(2)-chloro-2(3)-(4-chlorophenylthio)-2-ethylpropionic acid, methyl 3(2)-chloro-2(3)-(pentachlorophenylthio)-2-ethylpropionate, isobutyl 3(2)-chloro-2(3)-(dibromophenylthio)-2-ethylpropionate, etc.; compounds derivable from 2-methyleneoctanoic acid and esters such as phenyl 3(2)-chloro-2(3)-(4-chlorophenylthio)-2-hexylpropionate, cresyl 3(2)-chloro-2(3)-(4-bromophenylthio)-2-hexylpropionate, ethyl 3(2)-chloro-2(3)-(4-fluorophenylthio)-2-isohexylpropionate, etc.; compounds obtainable from 2-methylene-4,4-dimethylpentanoic acid such as 3(2)-chloro-2(3)-(4-chlorophenylthio)-2-neopentylpropionic acid, etc.; compounds obtainable from atropic acid and esters thereof such as methyl 3(2)-chloro-2(3) - (3-chloromethylphenylthio) - 2-phenylpropionate, etc.

It will be appreciated that the products of addition of the present aromatic sulfenyl halides to acrylic and substituted acrylic acids and esters are obtained as racemic mixtures of optical isomers, since the resulting compounds contain an asymmetric carbon atom. Optical isomers have the same physical properties, however, and are inseparable by ordinary techniques. It is intended that by the above listed nomenclature utilized for products of the addition of aromatic sulfenyl halides to acrylic acids and esters, there should be understood that there is meant either the individual separated optical isomers or the racemic mixture obtained in accordance with this invention.

In carrying out the present process, an α,β-unsaturated carboxylic compound of the above formula is simply contacted with one of the presently useful aromatic sulfenyl halides, to form a reaction product comprising adducts thereof. The process of the invention involves the reaction of equimolecular amounts of sulfenyl halide and unsaturated compound, but if desired, an excess of the more readily available reactant may be present in the reaction mixture to serve, e.g. as a diluent. The rapidity of reaction varies greatly, depending on the reactants chosen, some of the reactions herein reported being exothermic and requiring cooling and/or diluents to moderate the violence of the reaction, while others do not reach completion until after a period of refluxing at elevated temperatures. Suitable inert solvents and diluents which may be employed in the reaction mixture if desired include hydrocarbons such as benzene or hexane, halogenated solvents such as chloroform or ethylene dibromide, oxygenated solvents free of active hydrogen such as ether or dioxane, etc. A partially preferred class of solvents are anhydrous organic carboxylic acids and especially glacial acetic acid, since this solvent also has the advantage of acting as a catalyst for the reaction. Mixtures of glacial acetic acid and an inert solvent such as ethylene dichloride may also be used as a reaction medium if desired.

To accelerate the rate of the reaction when desired, heating and catalysts are employed. Suitable temperatures comprise, e.g., the reflux temperature of the reaction mixture. Acid catalysts are useful in accelerating the present reaction; in addition to the organic carboxylic acid catalyst mentioned above, there may alternatively be used a Friedel-Crafts catalyst such as aluminum trichloride or boron trifluoride complexes, etc. Pressure variation may also be used to facilitate the conduct of the reaction, e.g., by carrying out the reaction in a pressure-resistant vessel under autogenous pressure and at elevated temperatures.

Since unsaturated carboxylic acids and especially acrylic acid and its esters are susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction depends on functional factors such as the reactivity of the α,β-olefinic carboxylic compound and the sulfenyl halide, the temperature of reaction, the presence or absence of catalysts, etc. Reaction rates and times of reaction may vary considerably, depending on details of apparatus and other operational conditions. By modification of the apparatus, continuous procedures may be substituted for the batch-type operations described below.

Conveniently, the course of the reaction may be followed by observing the change in color of the reaction mixture. Sulfenyl halides are generally a deep red shade; as the reaction with the carboxylic acid compound proceeds, the color of the reaction mixture generally lightens gradually, usually becoming a clear yellow or orange shade by the time all the sulfenyl halide has reacted. On completion of the reaction, conventional methods such as filtration, decantation and evaporation may be employed to separate the product. It is to be noted that elevated distillation temperatures appear to promote dehydrohalogenation of the present products and the use of such elevated temperatures should be avoided unless the dehydrohalogenated product is the object of the synthesis.

As illustrative of the process of the invention, there are described the following non-limiting exemplary operations.

*Example 1*

To 20 g. (0.2 mole) of ethyl acrylate in 100 ml. of glacial acetic acid were added 31.7 g. (0.2 mole) of p-toluenesulfenyl chloride. There was an immediate exothermic reaction raising the temperature to 60° C. and changing the color from deep red to light yellow within 2 to 3 minutes. After standing overnight, the reaction mixture was distilled; there were collected 40.9 g. (79.2% yield) of ethyl 3(2)-chloro-2(3)-(4-methylphenylthio)propionate, B. 130–133°/0.3 mm., $n_D^{25}$ 1.5412, analyzing as follows:

| | Found | Calcd. for $C_{12}H_{15}ClO_2S$ |
|---|---|---|
| Percent C | 56.49 | 55.7 |
| Percent H | 5.92 | 5.84 |
| Percent Cl | 13.82 | 13.7 |
| Percent S | 12.84 | 12.4 |

*Example 2*

To 25.6 g. (0.2 mole) of butyl acrylate in 100 ml. of glacial acetic acid were added 31.7 g. of p-toluenesulfenyl chloride, producing an immediate exothermal reaction carrying the temperature to 60° C. and changing the color from deep red to light yellow in 2 to 3 minutes. By distillation of the reaction mixture, there were collected 46.0 g. (80.3% yield) of butyl 3(2)-chloro-2(3)-(4-methylphenylthio)propionate, as a yellow liquid, B. 146–150°/0.3 mm., $n_D^{25}$ 1.5349, analyzing as follows:

| | Found | Calcd. for $C_{14}H_{19}ClO_2S$ |
|---|---|---|
| Percent C | 59.23 | 58.6 |
| Percent H | 6.75 | 6.68 |
| Percent Cl | 11.89 | 12.4 |
| Percent S | 11.96 | 11.2 |

*Example 3*

This example describes the addition of an aromatic sulfenyl halide to α-substituted acrylate ester.

To 50 g. (0.5 mole) of methyl methacrylate in 250 ml. of glacial acetic acid were gradually added 79.25 g. (0.5 mole) of p-toluenesulfenyl chloride, with intermittent cooling to control the exothermic reaction; there were obtained 90 g. of methyl 3(2)-chloro-2(3)-(4-methylphenylthio)-2-methylpropionate, B. 139–141° C./0.3 mm., $n_D^{25}$ 1.5492, the identification of which was confirmed by infrared analysis and by the following elementary analysis:

| | Found | Calcd. for $C_{12}H_{15}ClO_2S$ |
|---|---|---|
| Percent C | 56.79 | 55.6 |
| Percent H | 5.84 | 5.84 |
| Percent Cl | 12.8 | 13.7 |
| Percent S | 13.08 | 12.35 |

Similarly, when to 25.4 g. (0.1 mole) of nonyl cinnamate is added 17.2 g. (0.1 mole) of xylenesulfenyl chloride in the presence of glacial acid, there is formed nonyl 3(2)-chloro-2(3)-(xylylthio)-3-phenylpropionate.

*Example 4*

To 17.2 (0.2 mole) of methyl acrylate in 100 ml. of glacial acetic acid was added 35.8 g. (0.2 mole) of p-chlorobenzenesulfenyl chloride. The mixture immediately began to evolve heat and to change from a red to a yellow color. In 2 minutes the temperature had reached 55° C. and the solution had become bright yellow. The reaction mixture was allowed to stand 10 minutes and then the acetic acid was removed and the product distilled. There were collected 44.5 g. of methyl 3(2)-chloro-2(3)-(4-chlorophenylthio)propionate, as a yellow liquid, B. 127–130° C./0.2 mm., $n_D^{25}$ 1.5689, the elementary analysis of which correspond closely to the theoretical calculated for $C_{10}H_{10}Cl_2O_2S$.

*Example 5*

This example describes the reaction of a halobenzenesulfenyl chloride with a higher alkyl ester of acrylic acid.

When 53.7 g. (0.3 mole) of p-chlorobenzenesulfenyl chloride was added to 55.2 g. (0.3 mole) of 2-ethylhexyl acrylate in 100 ml. of acetic acid, there was an immediate exothermic reaction carrying the reaction mixture temperature to 70° C., while the color of the reaction mixture changed from dark red to a light orange-yellow. After removal of the acetic acid, there were collected by vacuum distillation 94.5 g. of yellow 2-ethylhexyl 3(2)-chloro - 2(3) - (4-chlorophenylthio)propionate, B. 189–192° C./0.7 mm., $n_D^{25}$ 1.5039, corresponding very closely in elementary analysis to $C_{17}H_{24}Cl_2O_2S$.

*Example 6*

When 53.7 g. of p-chlorobenzenesulfenyl chloride was added to 76.2 g. (0.3 mole) of tridecyl acrylate in 100 ml. of glacial acetic acid, there was again an immediate exothermic reaction with a lightening in color of the reaction mixture. This reaction was somewhat slower than with the lower alkyl acrylates, taking 10 to 15 minutes. After standing 1 hour at room temperature, the solution was heated gradually to 70° C. Then the acetic acid was distilled off in vacuum and the temperature of the reaction mixture raised to 150° C. at 0.7 mm., there being removed 20 g. of forerun, which was unreacted sulfenyl halide and acrylate. The remaining pot contents weighed 106 g., $n_D^{25}$ 1.5250, and gave the following results on elemental analysis: 60.10%; 7.60% H; 8.53% S; 17.35% Cl. This material consisted of crude tridecyl 3(2)-chloro-2(3)-(4-chlorophenylthio)propionate.

When a portion of this amber thio ester was further heated to a temperature of 220° C., at 0.3–1.0 mm. pressure, there was evolution of hydrogen chloride, while a small amount of distillable material was collected. The undistillable reaction product, after filtration through attapulgus earth, was dark red in color, $n_D^{25}$ 1.5316, and analyzed as follows: 59.77% C; 7.26% H; 9.20% S; 17.53% Cl.

*Example 7*

This example describes the addition of a halogenated aromatic sulfenyl halide to an α-hydrocarbyl-substituted acrylic acid ester.

To 30 g. (0.3 mole) of methyl methacrylate in 100 ml. of glacial acetic acid was added 53.7 g. of p-chlorobenzenesulfenyl chloride. There was an immediate exothermic reaction, raising the reaction temperature to 70° C., while the color changed rapidly from dark red to a very light yellow, within 2 to 3 minutes. After the mixture had stood for about 15 minutes, the acetic acid was distilled off and the product distilled. There were collected 78 g. (93.5% yield) of methyl 3(2)-chloro-2(3)-(4-chlorophenylthio)-2-methylpropionate, as a yellow liquid, B. 136–138° C./0.25 mm., $n_D^{25}$ 1.5625, having the following elementary analysis:

| | Found | Calcd. for $C_{11}H_{12}Cl_2O_2S$ |
|---|---|---|
| Percent C | 47.46 | 47.4 |
| Percent H | 4.35 | 4.34 |
| Percent Cl | 25.44 | 25.4 |
| Percent S | 11.80 | 11.45 |

The presently provided reaction products of aromatic sulfenyl halides with unsaturated carboxylic acids and esters in accordance with this invention are relatively stable materials ranging from liquids to crystalline solids and soluble in a variety of organic solvents, but generally of low solubility in water. They are useful for a variety of agricultural and industrial purposes. The esters with higher alcohols containing from 7 to 16 carbon atoms may be used, for example, as plasticizing agents for polymers such as polyvinylidene chloride and as accelerators and vulcanizing agents for rubber such as chloroprene rubber. The lower alkyl esters with alcohols of 1 to 6 carbon are reactive compounds which may, with advantage, be employed in chemical syntheses, e.g., for reaction with trialkyl phosphites to produce compounds having biological toxicant properties and useful as oil additives, etc. The presently provided lower alkyl esters furthermore possess bacteriostatic and fungicidal properties and are useful as constituents of microbiological toxicant compositions. The present acids and esters of up to 16 carbon atoms are also active against higher organisms and may be used, e.g., as insecticides, algicides, nematocides, etc.; they are particularly useful as herbicides, for the erradication of undesired vegetation at rates of, e.g., 25–50 lbs./acre.

*Example 8*

This example describes evaluations of the presently provided compounds as biological toxicants.

For evaluation of bactiostatic and fungistatic effects, ethyl 3(2)-chloro-2(3)-(4-methylphenylthio)propionate was mixed with hot sterile agar to produce a concentration of 0.1% of the test chemical in the agar. The agar containing the ethyl 3(2)-chloro-2(3)-(4-methylphenylthio)propionate was poured into Petri dishes, cooled, and allowed to harden. Nutrient agar containing the test compound was then inoculated with the bacteria *Micrococcus pyogenes* var. *aureus* and *Salmonella typhosa* and Sabouraud's dextrose agar containing the ethyl ester was inoculated with the fungus organism *Aspergillus niger*. The plates were incubated for 5 days at 25° C. Complete control of the growth of each of these microorganisms was obtained, whereas there is profuse growth of the microorganisms under these conditions in agar plates not containing the test chemical.

The adduct of methyl methacrylate and p-toluenesulfenyl chloride, i.e., methyl 3(2)-chloro-2(3)-(4-methylphenylthio)propionate is also effective for the control of these microorganisms at a concentration of 0.1%.

For evaluation of herbicidal properties, an emulsion was prepared by dissolving the product of Example 2, i.e., n-butyl 3(2)-chloro-2(3)-(4-methylphenylthio)propionate, in acetone and adding thereto a small quantity of an emulsifying agent known as "Emulsifier L" and reputed to be a mixture of a polyalkylene glycol derivative and an alkylbenzenesulfonate; this emulsifiable concentrate was then diluted with water to form an 0.5% emulsion of the ester. Ten-day to two-week old specimens of various grasses, e.g., wild oat, brome grass, and dry grass; broad leaf plants, e.g., radish, sugar beet, and cotton; and two bean plants having one mature trifoliate and one partly opened trifoliate were then sprayed with this 0.5% emulsion of the product of Example 2 at a rate equivalent to 9 lbs. of active chemical per acre. After two weeks, the plants were observed; it was found that marked injury was exhibited by all of the treated plants.

When this butyl product of Example 2 was applied to soil containing seeds of broad leaf and grass plant species at a rate of 25 lbs./acre, it was found that the plants which germinated and emerged were of reduced vigor as compared to a control experiment wherein a similar planting of seeds were made but no test chemical was applied.

The present esters are also effective as plant fungicides. At a concentration of 200 parts per million, the ethyl 3(2)-chloro-2(3)-(4-methylphenylthio)propionate of Example 1 is effective for the control of the sporulation of *Monolinia fructicola*, causal agent of brown rot of stone fruits. As a test for the effectiveness of this ester as a systemic plant fungicide, two-week old Bonnie Best tomato seedlings were immersed in a solution containing 10 parts per million of ethyl 3(2)-chloro-2(3)-(4-methylphenylthio)propionate. After 48 hours, the seedlings were removed, the root systems rinsed, approximately one-third of the root system of each plant was severed and the wounded roots were dipped for 30 seconds in a suspension of bud cells of *Fusarium oxysporum* f. *lycopersici*, incitant of tomato wilt. A control plant not treated with the test chemical was similarly inoculated with Fusarium cells. The inoculated plants were potted and held in a greenhouse until the plant exhibited marked disease symptoms. The plants were then harvested and disease incidence evaluated by cross-sectioning the stem and examining for vascular browning. It was found that complete control of the wilt disease was obtained by the treatment with the present ethyl ester as herein described.

*Example 9*

This example describes evaluations of halogenated arenesulfenyl halide reaction products of the invntion as biological toxicants.

For evaluation of bacteriostatic and fungistatic effects, the test chemicals were mixed in predetermined concentrations with hot sterile agar which was subsequently poured into Petri dishes, cooled, and allowed to harden. Nutrient agar ocntaining the test compound was then inoculated with the bacteria *Micrococcus pyogenes* var. *aureus* and *Salmonella typhosa*, and Sabouraud's dextrose agar containing the test compounds was inoculated with the fungus organism *Aspergillus niger*. The plates were incubated for 5 days at 25° C. It was found that methyl 3(2)-chloro-2(3) - (4-chlorophenylthio) - 2 - methylpropionate, prepared as described in Example 7, inhibited the growth of each of these organisms at a concentration of 0.1%. Methyl 3(2)-chloro-2(3)-(4-chlorophenylthio) propionate, prepared as described in Example 4, inhibited growth of *M. pyogenes* and *A.* niger at down to 1 part per million, and inhibited the growth of *S. typhosa* at concenrations down to 0.01%.

For evaluation of heribicidal properties, an emulsion was prepared by dissolving the product of Example 5, i.e., 2-ethylhexyl 3(2)-chloro-2(3) - (4-chlorophenylthio)propionate, in acetone and adding thereto a small quantity of an emulsifying agent known as "Emulsifier L" and reputed to be a mixture of a polyalkylene glycol derivative and an alkylbenzenesulfonate; this emulsifiable concentrate was then diluted with water to form an 0.5% emulsion of the ester. Then-day to two-week old specimens of grasses, e.g., wild oat, brome grass, and rye grass; broadleaf plants, e.g., radish, sugar beets, and cotton; and two bean plants having one mature trifoliate and one partly opened trifoliate were then sprayed with this 0.5% emulsion of the product of Example 5 at a rate equivalent to 9 lbs. of active chemical per acre. After two weeks, the plants were observed; it was found that both grasses and broadleaf plants were injured, the broadleaf plants somewhat more severely, and the bean plants exhibited chlorosis and leaf curl.

When this 2-ethylhexyl ester reaction product of Example 5 was applied to soil containing seeds of broadleaf and narrowleaf plant species at a rate of 25 lbs. per acre, it was found that the plants which germinated and emerged were of reduced vigor as compared to a control experiment wherein a similar planting of seeds was made but no test chemical was applied.

The lower alkyl esters of the halogenated arenesulfenyl halide reaction products are also active as herbicides, particularly as foliage application herbicides, and are additionally effective for the suppression of germination of fungus spores such as *Monolina fructicola*, and for the protection of plants against fungus diseases caused by organisms such as *Fusarium lycopersici*, the incitant of a tomato wilt, when applied to the plant roots as a systemic fungicide.

It is to be noted that alternative methods are available for the synthesis of at least some of the compounds of this invention represented by the adduct formula 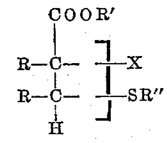 e.g., the addition of a thiol to an α-haloalkenoic acid or an ester. There are thereby produced compounds which are known to have an α-halo-β-thio structure. This invention contemplates the provision of arylthio-substituted haloalkanoic acids and esters of the above adduct structure generally, by whatever method they are produced.

Thus, for the preparation of 2-halo-3-(haloarylthio)-propionic esters, there is employed the addition of a halogenated aromatic thiol to an α-haloacrylic acid or ester thereof. Exemplary of useful halogenated aromatic thiols are 2-, 3-, and 4-chlorothiophenol, 4-fluorothiophenol, 3-bromo-4-iodothiophenol, 3,4- and 3,5-dichlorothiophenol, 2,4-dichlorothiophenol, 2,4,5-trichlorothiophenol, pentachlorothiophenol, 3-chloro-4-methylthiophenol, 2-chloro-4-methylthiophenol, 2,4-dichloro-5-methylthiophenol, 3-chloro-4 - neopentylthiophenol, chloromethylthiophenol, trichloromethylthiophenol, 3-chloro-4-chloromethylthiophenol, 4-chloropentylthiophenol, 5-chloronaphthalene-1-thiol, 5,8-dichloronaphthalene-1-thiol, 4'-chlorobiphenylthiol, etc., and for the preparation of other 2-halo-3-(arylthio)propionic esters of the invention, there is employed the addition of a non-halogenated aromatic thiol to an α-halo acrylic acid or ester thereof. Exemplary of useful non-halogenated aromatic thiols are thiophenol, o-toluenethiol, m-toluenethiol, p-toluenethiol, 2,4-xylenethiol, 3,4-xylenethiol, 2,3-xylenethiol, etc.

The useful α-haloalkenoic acids and esters are of the formula $$CH_2{=}\underset{\displaystyle X}{\underset{|}{C}}{-}COOR'$$

where X denotes a halogen atom and R' is as defined hereinabove, i.e., hydrogen or hydrocarbon radical free of aliphatic unsaturation and containing 1–16 carbon atoms. The α-chloroacrylic acid alkyl esters are the preferred such α-haloalkenoic compounds; the α-bromo-substituted compounds are substantially as reactive with the present thiols, while α-iodoacrylic acid and α-fluoroacrylic acid esters are less preferred but usable alternatives. Exemplary of useful esters of α-haloalkenoic acids are, e.g., alkyl esters such as methyl α-chloroacrylate, butyl α-chloroacrylate, 2-ethyloctyl α-chloroacrylate, tetradecyl α-chloroacrylate, hexadecyl α-chloroacrylate, methyl α-bromoacrylate, ethyl α-iodoacrylate, etc., and esters derived from aromatic and alicyclic alcohols such as phenyl α-chloroacrylate, cresyl α-chloroacrylate, cuminyl α-chloroacrylate, cyclohexyl α-chloroacrylate, cyclohexyl α-bromoacrylate, etc.

The products of the reaction of a haloarylthiol and a haloalkenoic acid or ester include 2-halo-3-(haloarylthio)propionic acids and their alkyl esters, e.g., 2-chloro-3-(4-chlorophenylthio)-propionic acid, methyl 2-chloro-3-(4-chlorophenylthio)propionate, methyl 2-bromo-3-(4-chlorophenylthio)propionate, 2-ethylhexyl 2-chloro-3-(4-chlorophenylthio)propionate, tridecyl 2-chloro - 3 - (4-chlorophenylthio)propionate, methyl 2-bromo - 3 - (4-bromophenylthio)propionate, methyl 2-chloro-3-(2,4,5-trichlorophenylthio)propionate, methyl 2-chloro-3-(3-methyl-4-chlorophenylthio)propionate, methyl 2-chloro-3-(3 - chloro - 4 - (chloromethyl)phenylthio)propionate, ethyl 2-chloro - 3 - (hexachlorobiphenylthio)proprionate.

etc., as well as esters derived from aromatic alcohols exemplified by phenyl 2-chloro-3-(4-chlorophenylthio)propionate, naphthyl 2-chloro-3-(pentachlorophenylthio)propionate, etc., and the products of the reaction of other arylthiols and α-haloalkenoic acid or ester including, e.g., 2-chloro-3-(phenylthio)propionic acid, methyl 2-chloro-3-(phenylthio)propionate, methyl 2-bromo-3-(o-tolylthio)propionate, 2-ethylhexyl 2-chloro-3-(m-tolylthio)propionate, tridecyl 2-chloro-3-(p-tolylthio)propionate, methyl 2-bromo-3-(3,4-xylylthio)propionate, methyl 2-chloro-3-(2,4-xylylthio)propionate, etc.

These 2-halo-3-(arylthio)propionic acids and esters free of hydrocarbon substituents on the carbon atom alpha to the carbonyl carbon atom are prepared by simply contacting one of the presently useful aromatic thiols with an α-halo acrylic acid or ester thereof of the formula given above. The reaction to give the present products requires approximately equimolar amounts of reactants as illustrated by the following equation:

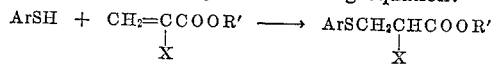

where Ar, X and R' are as defined hereinabove. If desired an excess of one component can be utilized as a reaction medium.

The reaction above illustrated may be carried out either in the absence or presence of solvents; examples of useful solvents are inert hydrocarbons such as benzene or halogenated solvents such as carbon tetrachloride. Polymerization inhibitors such as methylene blue, the monomethyl ether of hydroquinone, copper carbonate, etc., may be incorporated in the reaction mixture, if desired, to inhibit polymerization of the α-haloacrylic reaction component. The reaction is advantageously carried out in the presence of basic catalysts, e.g., sodium methylate, sodium hydroxide, pyridine, dimethylaniline, quaternary ammonium hydroxides such as benzyltrimethylammonium hydroxide or choline, etc.

The temperature of the reaction varies with the reactivity of the reactants; generally, the reaction mixture is conveniently heated to reflux to assure completion of the reaction. Pressure variation may be employed, e.g., to assist reaching different reaction temperatures, but generally atmospheric pressure is favorable for the reaction. Isolation of the reaction mixture is accomplished by the usual methods, e.g., extraction, distillation, etc.

The process for the production of arylthio-substituted halopropionic acids and esters free of hydrocarbon substituents on the alpha carbon atom by reaction of a thiol with an α-haloacrylic ester is exemplified by the following non-limiting example.

*Example 10*

To 14.5 g. (0.1 mole) of 4-chlorothiophenol in 49 ml. of dioxane containing 3 ml. of benzyltrimethylammonium hydroxide are added 12.0 g. (0.1 mole) of methyl α-chloroacrylate. The solution is refluxed for 2½ hours at 70-90° C. After neutralization with a mineral acid, the dioxane solution is decanted, filtered and distilled. There is thus obtained methyl 2-chloro-3-(4-chlorophenylthio)propionate of the formula

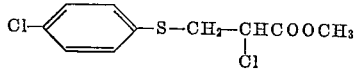

Similarly, by addition of 2,4,5-trichlorothiophenol to butyl α-bromoacrylate, there is obtained butyl 2-bromo-3-(2,4,5-trichlorophenylthio)propionate; by addition of trichloromethylthiophenol to methyl α-chloroacrylate there is obtained methyl 2-chloro-3-(trichloromethylphenylthio)propionate, by the addition of thiophenol to methyl α-chloroacrylate there is obtained methyl 2-chloro-3-(phenylthio)propionate, etc.

For application of the present adducts as parasiticides and active toxic constitutents of compositions for the control of parasites such as weeds, bacteria, and fungi, the compounds may be employed as constituents of solutions, of aqueous dispersions or emulsions, or in admixture with inert finely divided powder.

If desired, e.g., to impart increased water solubility to the present products, the 3-halo-2-arylthiopropionic and/or 2-halo-3-arylthiopropionic acids of the invention, prepared by a direct synthesis, or by hydrolysis of the esters thereof, may be converted to salts, e.g., water-soluble salts such as sodium or ammonium salts.

It is also contemplated that the presently provided sulfur-containing reaction products of arylthio-substituted haloalkanoic acids and esters produced by reaction of aromatic sulfenyl halides with olefinic acids and esters may be converted by oxidation (e.g., with hydrogen peroxide in acetic acid, potassium permanganate, chromic acid, etc.) into the corresponding sulfoxides and sulfones.

While the invention has been illustrated with particular reference to various preferred embodiments thereof, it will be understood that variations can be made without departing from the spirit and scope of the invention.

What is claimed is:
1. A compound of the formula

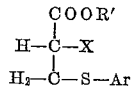

wherein R' is an alkyl of from 1 to 16 carbon atoms, X is selected from the class consisting of chlorine and bromine and Ar is selected from the class consisting of phenyl, tolyl, xylyl and halogenated phenyl.

2. Compounds of claim 1 wherein X is chlorine, R' is methyl and Ar is phenyl having from 0 to 2 methyl groups.

3. Compounds of claim 1 wherein X is chlorine, R' is methyl and Ar is chlorinated phenyl.

4. Methyl 2-chloro-3-(4-chlorophenylthio)propionate.

References Cited in the file of this patent

UNITED STATES PATENTS

| | | |
|---|---|---|
| 1,811,316 | Herz et al. | June 23, 1931 |
| 2,199,799 | Jacobson | May 7, 1940 |
| 2,434,100 | Bousquet | Jan. 6, 1948 |
| 2,883,317 | Heininger et al. | Apr. 21, 1959 |

OTHER REFERENCES

Kharasch et al.: J. Am. Chem. Soc., 71, 2724-5 (1949).
Kharasch et al.: J. Am. Chem. Soc., 75, 3734-5 (1953).
Sparke et al.: J. Am. Chem. Soc., 75, 4907-8 (1953).
Campos: J. Am. Chem. Soc., 76, 4480-1 (1954).

UNITED STATES PATENT OFFICE
CERTIFICATE OF CORRECTION

Patent No. 3,064,036                                          November 13, 1962

Samuel Allen Heininger et al.

It is hereby certified that error appears in the above numbered patent requiring correction and that the said Letters Patent should read as corrected below.

Column 3, line 44, for "component" read -- compound --; column 4, line 8, for "2(3)-chloro-2(3)-" read -- 3(2)-chloro-2(3)- --; column 5, line 53, strike out "3(2)-"; same line 53, for "-2-methylpropriate" read -- -2-methylpropionate --; column 6, line 16, for "at" read -- of --; column 11, line 54, for "Then-day" read -- Ten-day --; column 14, line 10, for "constitutents" read -- constituents --.

Signed and sealed this 21st day of May 1963.

(SEAL)
Attest:

ERNEST W. SWIDER                                                DAVID L. LADD
Attesting Officer                                              Commissioner of Patents